(No Model.)

I. A. KILMER.
BALE TIE.

No. 476,654. Patented June 7, 1892.

WITNESSES
Thos. Houghton
H. H. Grayson

INVENTOR
Irving A. Kilmer.
per W. H. Singleton,
Atty.

THE NORRIS PETERS CO., PHOTO-LITHO., WASHINGTON, D. C.

United States Patent Office.

IRVING A. KILMER, OF NEWBURG, NEW YORK.

BALE-TIE.

SPECIFICATION forming part of Letters Patent No. 476,654, dated June 7, 1892.

Application filed October 19, 1891. Serial No. 409,178. (No model.)

*To all whom it may concern:*

Be it known that I, IRVING A. KILMER, a citizen of the United States, residing at Newburg, in the county of Orange and State of New York, have invented certain new and useful Improvements in Bale-Ties; and I do declare the following to be a full, clear, and exact description of the invention, such as will enable others skilled in the art to which it appertains to make and use the same, reference being had to the accompanying drawings, and to the letters of reference marked thereon, which form a part of this specification.

The object of the present invention is to produce a bale-tie which will not yield when the bale is released from the press; and it consists in a bale-tie having the construction hereinafter set forth.

Figure 1:
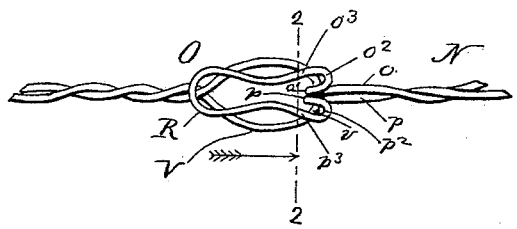
Figure 2:
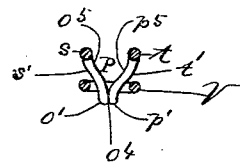
Figure 3:
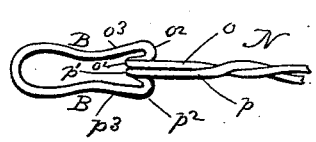
Figure 4:
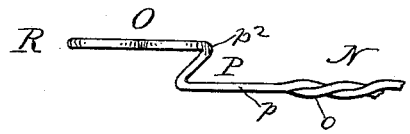

Figure 1 is a perspective view of a bale-tie containing the present invention. Fig. 2 is a sectional view on line 2 2 of Fig. 1, looking in the direction of the arrow. Fig. 3 is a top view, and Fig. 4 a side view, of the hook.

This invention relates to an improvement on bale-ties, more especially those made of wire, in which the tie is made of one piece of wire having a hook at one end and a loop at the other.

In the accompanying drawings the letter N represents one portion of the bale-tie provided with a hook O, consisting of a catch P, with forward brace R. To form this hook O, strands $o$ and $p$ are curved away from main strands of the tie, as at $o'$ and $p'$, then backward, as at $o^2$ and $p^2$, then forward, as at $o^3$ and $p^3$, terminating in the brace R, as these side strands $o$ and $p$ curve away from the main strand at right angles thereto, so as to form the catch P and hook O. They also diverge sidewise from each other. These strands $o$ and $p$ touch each other, as at $o^4$, just as they commence to make the first curve $o'$ and $p'$, then curving sidewise, as at $o^5$ and $p^5$. This gives to the vertical branches of brace $s$ and $t$ of these strands $o$ and $p$ a somewhat Y shape, as shown in Fig. 2, the members $s$ and $t$ having formed in them on the outside the angles or concaves $s'$ and $t'$. This construction causes the portion of the tie forming the catch P to be spread apart sidewise as well as curved lengthwise. From the catch P strands $o$ and $p$ converge to the center B and the opening of the eye at R to be the same as the catch P. Upon the other end of the bale-tie is formed the usual loop V, as shown in Fig. 1. The side strands of the hook N are nearly closed at the center, and they are to be made preferably this way, so as better to resist strain.

In applying the bale-tie it is hooked together after having been passed around the bale and by slipping the hook end through the loop V. The bale of hay, cotton, or other material is released from the press or the power thereof, so that it expands, and the loop V draws against the hook. The end $v$ of the loop V being narrower than the spread of the catch P, the loop is caught in under the angles or concaves $s'$ and $t'$. This action elongates the loop V, bringing its sides closer together, and consequently more beneath the hook N; and even should there be no elongation of the loop it still could not slip off of the hook, as the overhanging parts of the latter will effectually prevent slipping. By this construction the hook has three braces bearing down on the loop—the ordinary forward one R and the two at the sides.

Having described my invention, what I claim is—

A bale-tie having at one end the usual loop and at the other a hook consisting of a catch and forward brace, the strand-wires composing the hook being nearly closed near the center and the vertical branches or members diverging, as set forth.

In testimony whereof I affix my signature in presence of two witnesses.

IRVING A. KILMER.

Witnesses:
THALAS S. KILMER,
EDWIN D. FULLER.